(12) United States Patent  (10) Patent No.: US 12,481,189 B2
Xu et al.  (45) Date of Patent: Nov. 25, 2025

(54) DISPLAY SUBSTRATE, MANUFACTURING METHOD THEREOF AND DISPLAY APPARATUS

(71) Applicants: Fuzhou BOE Optoelectronics Technology Co., Ltd., Fujian (CN); BOE TECHNOLOGY GROUP CO., LTD., Beijing (CN)

(72) Inventors: Shanshan Xu, Beijing (CN); Xu Xu, Beijing (CN); Hui Chen, Beijing (CN); Zongxiang Li, Beijing (CN); Yaochao Lv, Beijing (CN); Zuwen Liu, Beijing (CN)

(73) Assignees: Fuzhou BOE Optoelectronics Technology Co., Ltd., Fujian (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/021,855

(22) PCT Filed: Mar. 21, 2022

(86) PCT No.: PCT/CN2022/081971
  § 371 (c)(1),
  (2) Date: Feb. 17, 2023

(87) PCT Pub. No.: WO2023/178471
  PCT Pub. Date: Sep. 8, 2023

(65) Prior Publication Data
  US 2024/0272498 A1  Aug. 15, 2024

(51) Int. Cl.
  *G02F 1/1343* (2006.01)
  *G02F 1/1362* (2006.01)
  *G02F 1/1368* (2006.01)

(52) U.S. Cl.
  CPC .. *G02F 1/134309* (2013.01); *G02F 1/134318* (2021.01); *G02F 1/134363* (2013.01); *G02F 1/136286* (2013.01); *G02F 1/1368* (2013.01)

(58) Field of Classification Search
  CPC ......... G02F 1/134309; G02F 1/134363; G02F 1/136286; G02F 1/134318
  See application file for complete search history.

(56) References Cited

U.S. PATENT DOCUMENTS

2002/0131005 A1  9/2002  Yang
2004/0263757 A1  12/2004  Kwon
(Continued)

FOREIGN PATENT DOCUMENTS

CN  1614482 A  5/2005
CN  101196664 A  6/2008
(Continued)

OTHER PUBLICATIONS

China Patent Office, First Office Action dated Jan. 7, 2025, for corresponding CN application No. 202280000496.5.

*Primary Examiner* — Jia X Pan
(74) *Attorney, Agent, or Firm* — HOUTTEMAN LAW LLC

(57) ABSTRACT

A display substrate, where each sub-pixel includes lower and upper electrodes on a base substrate; the lower electrode includes multiple first and second electrode strips; the upper electrode includes multiple third and fourth electrode strips; the first and third electrode strips are electrically connected together; the second and fourth electrode strips are electrically connected together; two adjacent electrode strips in the first and/or second electrode strips are mutually spaced apart; two adjacent electrode strips in the third and/or fourth electrode strips are mutually spaced apart; M sequentially adjacent first electrode strips and N sequentially adjacent second electrode strips are alternately arranged; M sequen-
(Continued)

tially adjacent third electrode strips and N sequentially adjacent fourth electrode strips are alternately arranged; M=1, 2, 3, . . . ; N=1, 2, 3, . . . ; M and N are integers; and orthographic projections of the electrode strips of the upper and lower electrodes on the base substrate are alternately arranged.

20 Claims, 17 Drawing Sheets

(56) References Cited

U.S. PATENT DOCUMENTS

2009/0033848 A1\* 2/2009 Oka ................. G02F 1/134363
349/114

2014/0132907 A1\* 5/2014 Qin ................... G02F 1/134363
349/143

2016/0004127 A1\* 1/2016 Qu ....................... G09G 3/3696
345/212

FOREIGN PATENT DOCUMENTS

| | | |
|---|---|---|
| CN | 101950103 A | 1/2011 |
| CN | 102929068 A | 2/2013 |
| CN | 203405655 U | 1/2014 |
| CN | 205263445 U | 5/2016 |
| CN | 106129065 A | 11/2016 |
| CN | 104155815 B | 3/2017 |
| CN | 109061932 A | 12/2018 |
| CN | 109239989 A | 1/2019 |
| CN | 109669305 A | 4/2019 |

\* cited by examiner

DISPLAY SUBSTRATE, MANUFACTURING METHOD THEREOF AND DISPLAY APPARATUS

TECHNICAL FIELD

Embodiments of the present disclosure belong to the field of display technology, and in particular, relate to a display substrate, a manufacturing method thereof and a display apparatus.

BACKGROUND

An ADS (including HADS) display mode of a liquid crystal display panel belongs to a plane electric field display mode, and an electric field in a liquid crystal cell is not uniformly distributed in the transverse direction and the longitudinal direction. When positive and negative frames are changed, liquid crystal molecules are distorted and deformed due to the flexoelectric effect of the liquid crystal, so that the transmittances of the sub-pixels in the positive and negative frames are different from each other, and finally a measured VT (Voltage-Transmittance) curve is asymmetric. The VT curve is the most important basis for adjusting the sub-pixel driving voltage (i.e. Gamma tuning), and if the VT curve is asymmetric, it will result in defects such as decreased transmittance, flicker in display image, image sticking, or flicker drift.

SUMMARY

The embodiments of present disclosure provide a display substrate, a manufacturing method thereof and a display apparatus.

In a first aspect, an embodiment of the present disclosure provides a display substrate, including:
  a base substrate; and
  a plurality of sub-pixels on the base substrate and arranged in an array,
  where each of the plurality of sub-pixels includes a lower electrode and an upper electrode, and the lower electrode and the upper electrode are sequentially stacked in a direction away from the base substrate;
  the lower electrode includes a plurality of first electrode strips and a plurality of second electrode strips; the upper electrode includes a plurality of third electrode strips and a plurality of fourth electrode strips; the plurality of first electrode strips are electrically connected to the plurality of third electrode strips; the plurality of second electrode strips are electrically connected to the plurality of fourth electrode strips;
  two adjacent electrode strips in the first electrode strips and/or the second electrode strips are spaced apart from each other; and two adjacent electrode strips in the third electrode strips and/or the fourth electrode strips are spaced apart from each other;
  M number of sequentially adjacent first electrode strips and N number of sequentially adjacent second electrode strips are alternately arranged;
  M number of sequentially adjacent third electrode strips and N number of sequentially adjacent fourth electrode strips are alternately arranged; where M=1, 2, 3, . . . ; N=1, 2, 3, . . . ; and M and N are integers;
  orthographic projections of the electrode strips of the upper electrode and the electrode strips of the lower electrode on the base substrate are alternately arranged; and
  one of the first electrode strips and one of the fourth electrode strips are each arranged at a first place in a first direction; and the first direction is an arrangement direction of the first electrode strips and the second electrode strips and also an arrangement direction of the third electrode strips and the fourth electrode strips.

In some embodiments, all the first electrode strips and the second electrode strips have a same width; and
  a first spacing between any two adjacent electrode strips in the first electrode strips and/or the second electrode strips is equal.

In some embodiments, all the third electrode strips and the fourth electrode strips have a same width; and
  a second spacing between any two adjacent electrode strips in the third electrode strips and/or the fourth electrode strips is equal.

In some embodiments, all the first electrode strips and the third electrode strips have a same width; and/or
  the first spacing and the second spacing are equal to each other.

In some embodiments, a ratio of the width of the first electrode strip to the first spacing is in a range from 1/3 to 3/4; and
  a ratio of the width of the third electrode strips to the second spacing is in a range from 1/3 to 3/4.

In some embodiments, the display apparatus further includes a plurality of gate lines, a plurality of data lines, a plurality of common electrode lines, and a plurality of switching transistors;
  each of the plurality of gate lines is between two adjacent rows of the sub-pixels;
  each of the plurality of data lines is between two adjacent columns of the sub-pixels;
  each of the plurality of common electrode lines is between two adjacent rows of the sub-pixels;
  the gate line connected to the sub-pixels in a same row and the common electrode line connected to the sub-pixels in the same row are on two sides of the sub-pixels in this row along an extending direction of the data line;
  the gate lines and the data lines are spatially crossed to form a plurality of pixel regions; and
  lengths of the first electrode strip, the second electrode strip, the third electrode strip and the fourth electrode strip extend along the extending direction of the data line.

In some embodiments, the lower electrode further includes a first connection part and a second connection part;
  the first connection part is at an end of the first electrode strip close to the common electrode line, and is connected to the first electrode strip and the common electrode line; and
  the second connection part is at an end of the second electrode strip close to the gate line, and is connected to the second electrode strip and a drain of the switching transistor.

In some embodiments, the upper electrode further includes a third connection part and a fourth connection part;
  the third connection part is at an end of the third electrode strip close to the common electrode line, and is connected to the third electrode strip and the common electrode line; and
  the fourth connection part is at an end of the fourth electrode strip close to the gate line, and is connected to the fourth electrode strip and the drain of the switching transistor.

In some embodiments, a length of the first connection part extends along an extending direction of the common electrode line;
    the first connection part is connected to the plurality of first electrode strips to form a comb-shaped structure;
    a length of the second connection part extends along an extending direction of the gate line; and
    the second connection part is connected to the plurality of second electrode strips to form a comb-shaped structure.

In some embodiments, a length of the third connection part extends along the extending direction of the common electrode line;
    the third connection part is connected to the plurality of third electrode strips to form a comb-shaped structure;
    a length of the fourth connection part extends along the extending direction of the gate line; and
    the fourth connection part is connected to the plurality of fourth electrode strips to form a comb-shaped structure.

In some embodiments, a gate of the switching transistor, the gate line, the common electrode line, and the lower electrode are on the base substrate;
    an active layer of the switching transistor is on a side of the gate away from the base substrate, and a gate insulating layer is between the gate and the active layer;
    a source and the drain of the switching transistor are on a side of the active layer away from the base substrate, and are arranged at two opposite ends of the active layer, respectively;
    the upper electrode is on a side of the source and the drain away from the base substrate, and a passivation layer is between the upper electrode, and the source and the drain;
    the gate insulating layer and the passivation layer each further extend between the lower electrode and the upper electrode;
    the first connection part and the common electrode line are formed integrally into a one-piece structure;
    an orthographic projection of the third connection part on the base substrate at least partially overlaps an orthographic projection of the common electrode line on the base substrate;
    a first via is formed in the passivation layer and the gate insulating layer at a region where the orthographic projection of the third connection part on the base substrate overlaps the orthographic projection of the common electrode line on the base substrate, and the third connection part is connected to the common electrode line through the first via.

In some embodiments, a part of the second connection part extends such that an orthographic projection of the second connection part on the base substrate overlaps an orthographic projection of the drain on the base substrate;
    a part of the fourth connection part extends such that an orthographic projection of the fourth connection part on the base substrate overlaps the orthographic projection of the drain on the base substrate; and
    a second via is formed in the passivation layer and the gate insulating layer at a region where the orthographic projections of the second connection part, the fourth connection part and the drains on the base substrate overlap each other, and the fourth connection part is connected to the drain and the second connection part through the second via.

In some embodiments, one of the third electrode strips at an edge of the upper electrode extends toward the drain to form a first sub-portion;
    the drain extends toward the first sub-portion to form a second sub-portion; and
    orthographic projections of the first sub-portion and the second sub-portion on the base substrate overlap each other.

In some embodiments, one of the first electrode strips at the edge of the lower electrode extends toward the drain to form a third sub-portion; and
    an orthographic projection of the third sub-portion on the base substrate overlaps the orthographic projection of the second sub-portion on the base substrate.

In some embodiments, an orthographic projection of the third electrode strip at the edge of the upper electrode on the base substrate overlaps an orthographic projection of the data line on the base substrate; and
    a width of the third electrode strip at the edge of the upper electrode and having the orthographic projection on the base substrate overlapping the orthographic projection of the data line on the base substrate is greater than a width of the third electrode strip in the pixel region.

In some embodiments, an orthographic projection of the first electrode strip at an edge of the lower electrode on the base substrate overlaps the orthographic projection of the data line on the base substrate; and
    a width of the first electrode strip at the edge of the lower electrode and having the orthographic projection on the base substrate overlapping the orthographic projection of the data line on the base substrate is greater than a width of the first electrode strip in the pixel region.

In some embodiments, the sub-pixel is divided into two domains in the extending direction of the data line;
    a domain boundary between the two domains extends along an extending direction of the gate line;
    a part of the data line near the domain boundary is bent in a direction approaching the domain boundary; and
    parts of the first electrode strip, the second electrode strip, the third electrode strip and the fourth electrode strip near the domain boundary are each bent in the direction approaching the domain boundary, and bent shapes of the parts are each matched with a bent shape of the data line.

In a second aspect, an embodiment of the present disclosure further provides a method of manufacturing a display substrate, where the method includes: forming a plurality of sub-pixels on a base substrate;
    the forming the plurality of sub-pixels includes: sequentially forming a lower electrode and an upper electrode on the base substrate;
    the forming the lower electrode includes: forming a plurality of first electrode strips and a plurality of second electrode strips; and
    the forming the upper electrode includes: forming a plurality of third electrode strips and a plurality of fourth electrode strips.

In some embodiments, the plurality of first electrode strips and the plurality of second electrode strips are formed through one patterning process; and
    the plurality of third electrode strips and the plurality of fourth electrode strips are formed through one patterning process.

In a third aspect, an embodiment of the present disclosure further provides a display apparatus, where the display apparatus includes the display substrate described above.

BRIEF DESCRIPTION OF DRAWINGS

The accompanying drawings, which are included to provide a further understanding of the present disclosure and constitute a part of this specification, serve to explain the present disclosure together with the following detailed description, but do not constitute a limitation of the present disclosure. The above and other features and advantages will become more apparent to one of ordinary skill in the art by describing detailed examples with reference to the accompanying drawings, in which.

DETAIL DESCRIPTION OF EMBODIMENTS

Figure 1A:
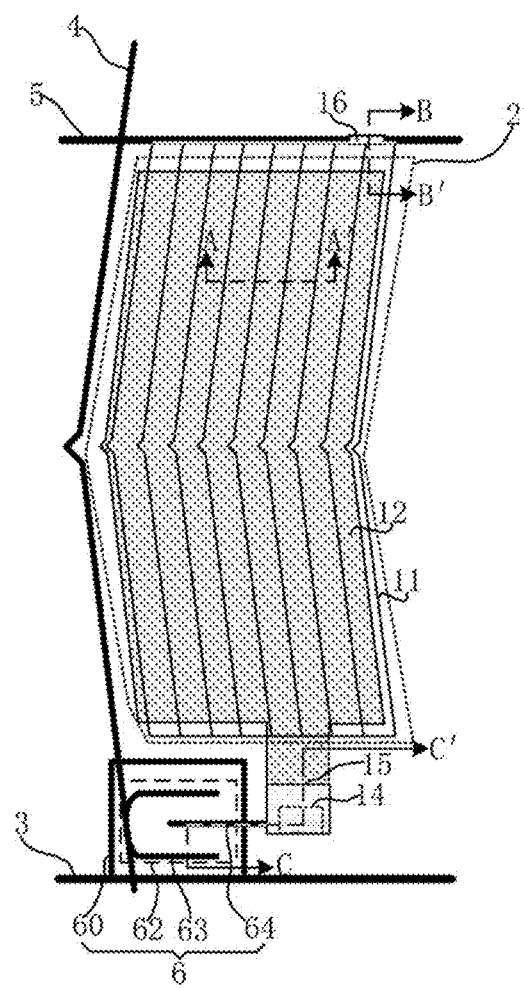
FIG. 1A is a top view illustrating a structure of a sub-pixel in a liquid crystal display panel of an ADS or HADS display mode in the related art.

In order to enable one of ordinary skill in the art to better understand the technical solutions of the embodiments of the present disclosure, a display substrate, a manufacturing method thereof, and a display apparatus provided in the embodiments of the present disclosure are further described in detail below with reference to the accompanying drawings and specific implementations.

The embodiments of the present disclosure will be described more fully hereinafter with reference to the accompanying drawings, and may be embodied in different forms and should not be construed as limited to the embodiments set forth herein. Rather, these embodiments are provided so that this disclosure will be thorough and complete, and will fully convey the scope of the present disclosure to one of ordinary skill in the art.

The embodiments of the present disclosure are not limited to the embodiments shown in the drawings, but include modifications of configurations formed based on a manufacturing process. Thus, the regions illustrated in the figures have schematic properties, and the shapes of the regions shown in the figures illustrate specific shapes of the regions, but are not intended to be limiting.

Figure 1B:
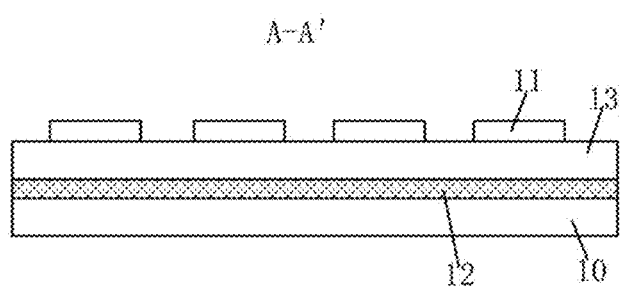
FIG. 1B is a cross-sectional view illustrating a structure taken along a section line AA' in FIG. 1A.
Figure 1C:
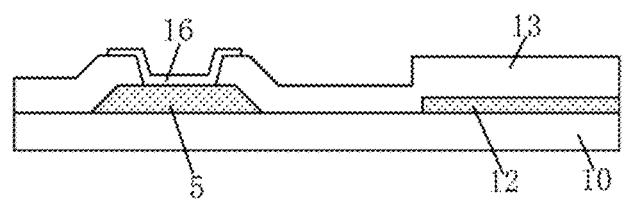
FIG. 1C is a cross-sectional view illustrating a structure taken along a section line BB' in FIG. 1A.
Figure 1D:
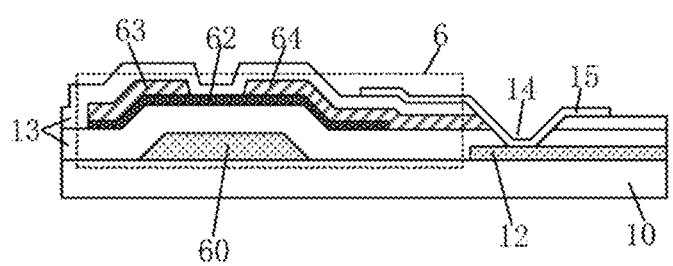
FIG. 1D is a cross-sectional view illustrating a structure taken along a section line CC' in FIG. 1A.

FIG. 1A is a top view illustrating a structure of a sub-pixel in a liquid crystal display panel of an ADS (Advanced Super Dimension Switch) or HADS (High Advanced Super Dimension Switch) display mode in the related art; FIG. 1B is a cross-sectional view illustrating a structure taken along a section line AA' in FIG. 1A; FIG. 1C is a cross-sectional view illustrating a structure taken along a section line BB' in FIG. 1A; FIG. 1D is a cross-sectional view illustrating a structure taken along a section line CC' in FIG. 1A. Referring to FIG. 1A, in the related art, the display panel includes a gate line 3, a data line 4, a common electrode line 5, and a switching transistor 6; the gate lines 3 and the data lines 4 are spatially crossed to define a pixel region, and a sub-pixel 2 is arranged in the pixel region; the common electrode line 5 and the gate line 3 are arranged on two opposite sides of the sub-pixel 2 along an extending direction of the data line 4, respectively; the switching transistor 6 is located in the pixel region and at a position where the gate line 3 and the data line 4 cross each other. The switching transistor 6 includes a gate 60, an active layer 62, a source 63 and a drain 64; the source 63 and the drain 64 are arranged on two opposite ends of the active layer 62, respectively, and are each in contact with the active layer 62. The sub-pixel 2 includes two electrodes which are sequentially stacked on a base substrate 10, the top one is a slit-shaped common electrode 11, the bottom one is a planar pixel electrode 12, the top electrode and the bottom electrode are insulated from each other by arranging an insulating layer 13, and orthographic projections of the two electrodes on the base substrate 10 overlap each other. The bottom pixel electrode 12 is connected to the drain 64 of the switching transistor 6 through a third via 14 formed in the insulating layer 13 and a conductive structure 15 arranged in the same layer as the top common electrode 11 but not connected to the top common electrode 11. The top common electrode 11 is connected to the bottom common electrode line 5 (which is arranged in the same layer as the pixel electrode 12 but not connected to the pixel electrode 12) through a fourth via 16 formed in the insulating layer 13.

Figure 1E:
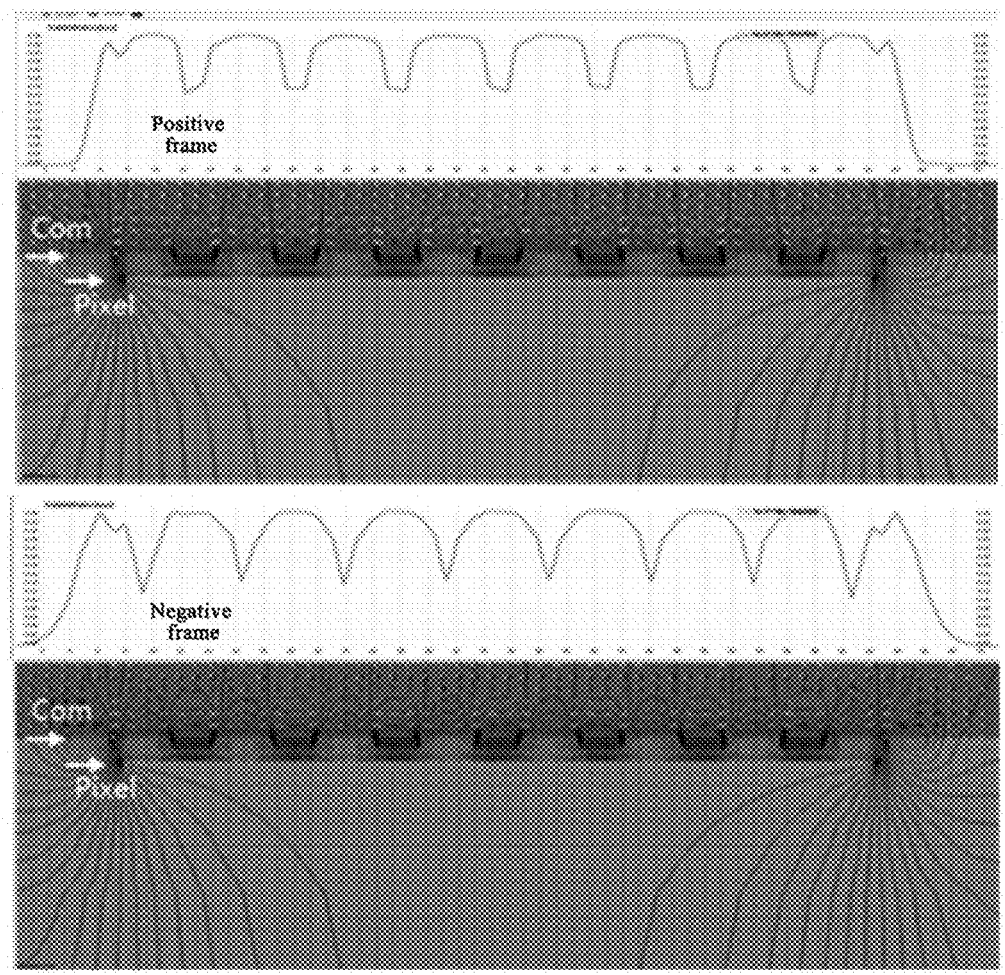
FIG. 1E is a schematic diagram illustrating a difference between electric field/optical effect of the sub-pixel structure in FIG. 1A in a positive frame and electric field/optical effect of the sub-pixel structure in FIG. 1A in a negative frame.
Figure 1F:
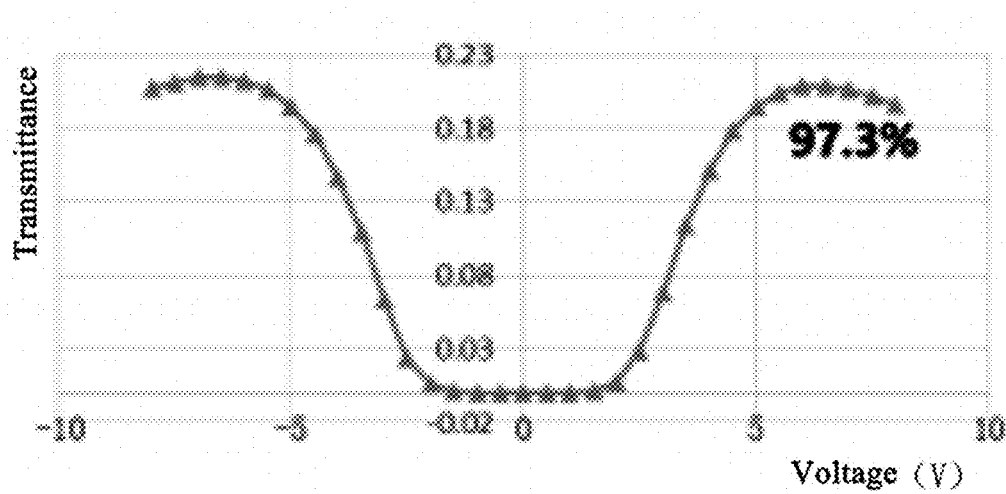
FIG. 1F illustrates a VT curve of the sub-pixel structure of FIG. 1A in positive and negative frames.

Since the electric field in the liquid crystal cell is not uniformly distributed in the transverse direction and the longitudinal direction, the electric fields of the positive and negative frames are asymmetric to each other. When the positive and negative frames are changed, liquid crystal molecules are distorted and deformed due to the flexoelectric effect of the liquid crystal, so that the transmittances of the sub-pixels in the positive and negative frames are different from each other, and the difference is mainly at dark regions with the lowest transmittance. Referring to FIG. 1E, which is a schematic diagram illustrating a difference between electric field/optical effect of the sub-pixel structure in FIG. 1A in a positive frame and electric field/optical effect of the sub-pixel structure in FIG. 1A in a negative frame, as can be seen from FIG. 1E, in the positive frame, the dark region is right above the top common electrode strip; in the negative frame, the dark region is between the top common electrode strips adjacent to each other. The more the dark regions are, the larger the difference between the light effects (i.e. transmittances) of the positive and negative frames is, and the transmittance curves of the positive and negative frames are different in the dark regions. According to the simulation and actual measurement results, referring to FIG. 1F, which is a VT curve (i.e., voltage-transmittance curve) of the sub-pixel structure in FIG. 1A in positive and negative frames, it can be seen from FIG. 1F that the data voltage corresponding to the point with the highest transmittance (i.e., VOP voltage) in the VT curve is 6.5V, and a difference proportion between the positive and negative frame transmittances (positive frame transmittance/negative frame transmittance) is 97.3%. That is, the VT curve of the sub-pixel structure in FIG. 1A is asymmetric.

The asymmetry of the VT curve will cause the following problems. First, the transmittance is decreased; the reason for this problem is as follows: in order to ensure that the difference between the positive and negative frame transmittances is minimum, during setting the voltages on both ends (namely, data voltages corresponding to several points with high transmittances in the positive and negative frames in the VT curve), voltages corresponding to points with lower transmittances are selected (namely, in the data voltages corresponding to the several points with high transmittances in the positive and negative frames in the VT curve, data voltages corresponding to points with the lowest point transmittances in the VT curve are selected), and the other points with higher transmittances are sacrificed, so that the overall transmittance of the liquid crystal display panel is decreased. Second, the display image flickers; the reason of this problem is as follows: there is a difference between sub-pixel transmittances for the positive and negative frames, and human eyes can see flickers, and the larger the difference between the sub-pixel transmittances for the positive and negative frames is, the more obvious flickers can be seen. Third, image sticking or flicker drift; the reason for this problem is as follows: the asymmetry of the positive and negative frame electric fields (i.e. the asymmetry of the voltages at points with the high transmittance in the positive and negative frames) causes polarization of the liquid crystal, and the direct current bias voltage in the cell is generated, resulting in the defect of image sticking or flicker drift.

Figure 2A:
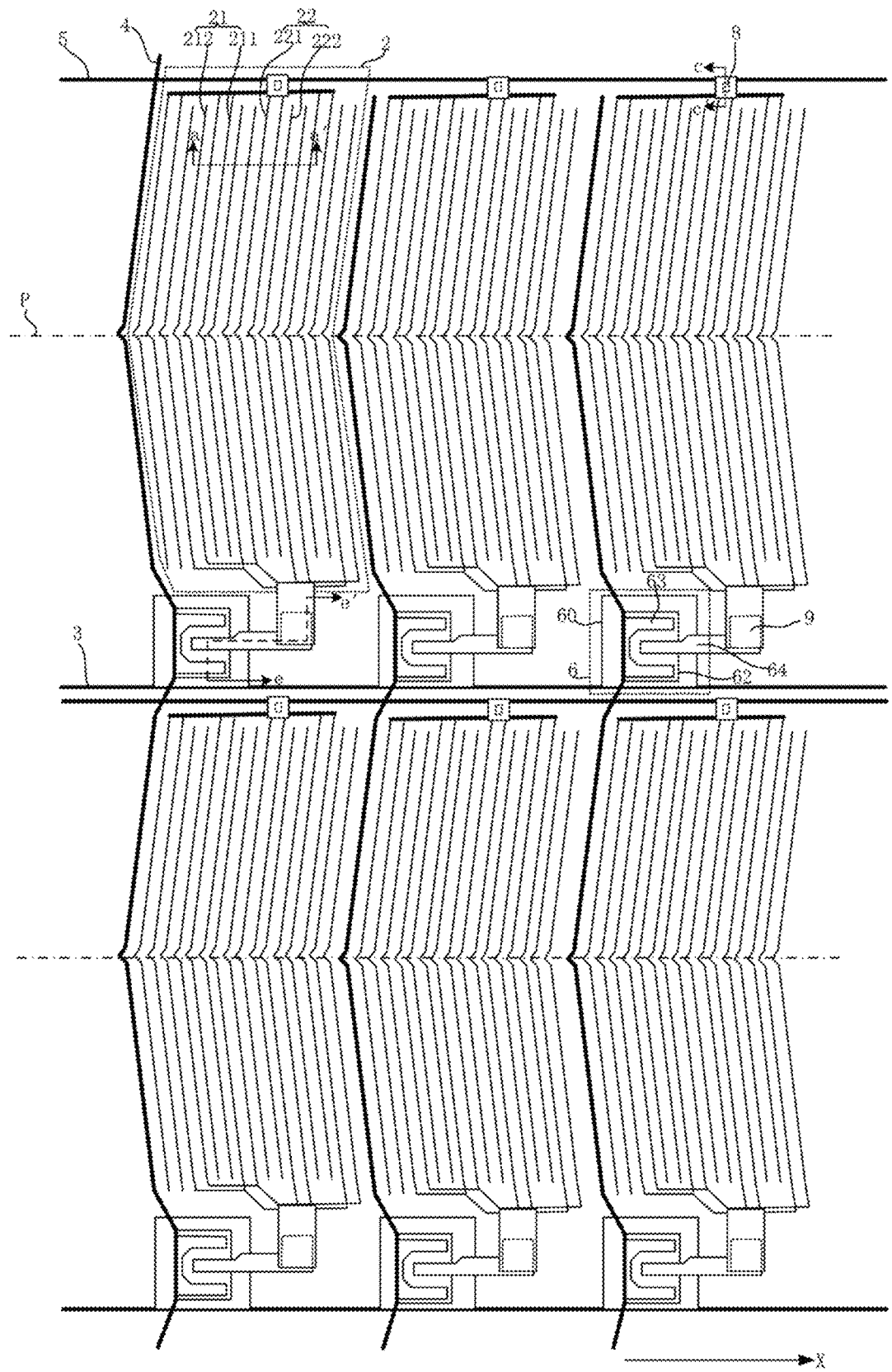
FIG. 2A is a top view illustrating a part of a structure of a display substrate according to an embodiment of the present disclosure.
Figure 2B:
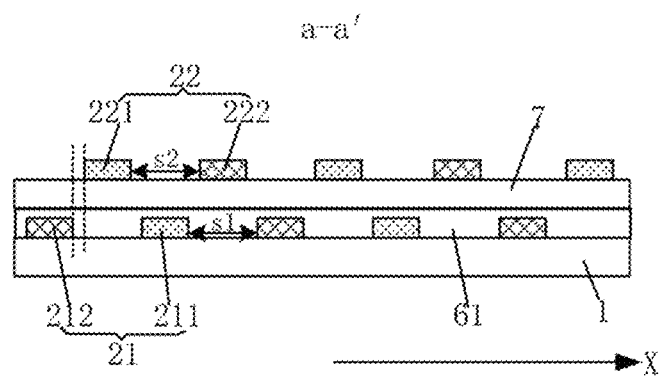
FIG. 2B is a cross-sectional view illustrating a structure taken along a section line aa' in FIG. 2A.
Figure 3A:
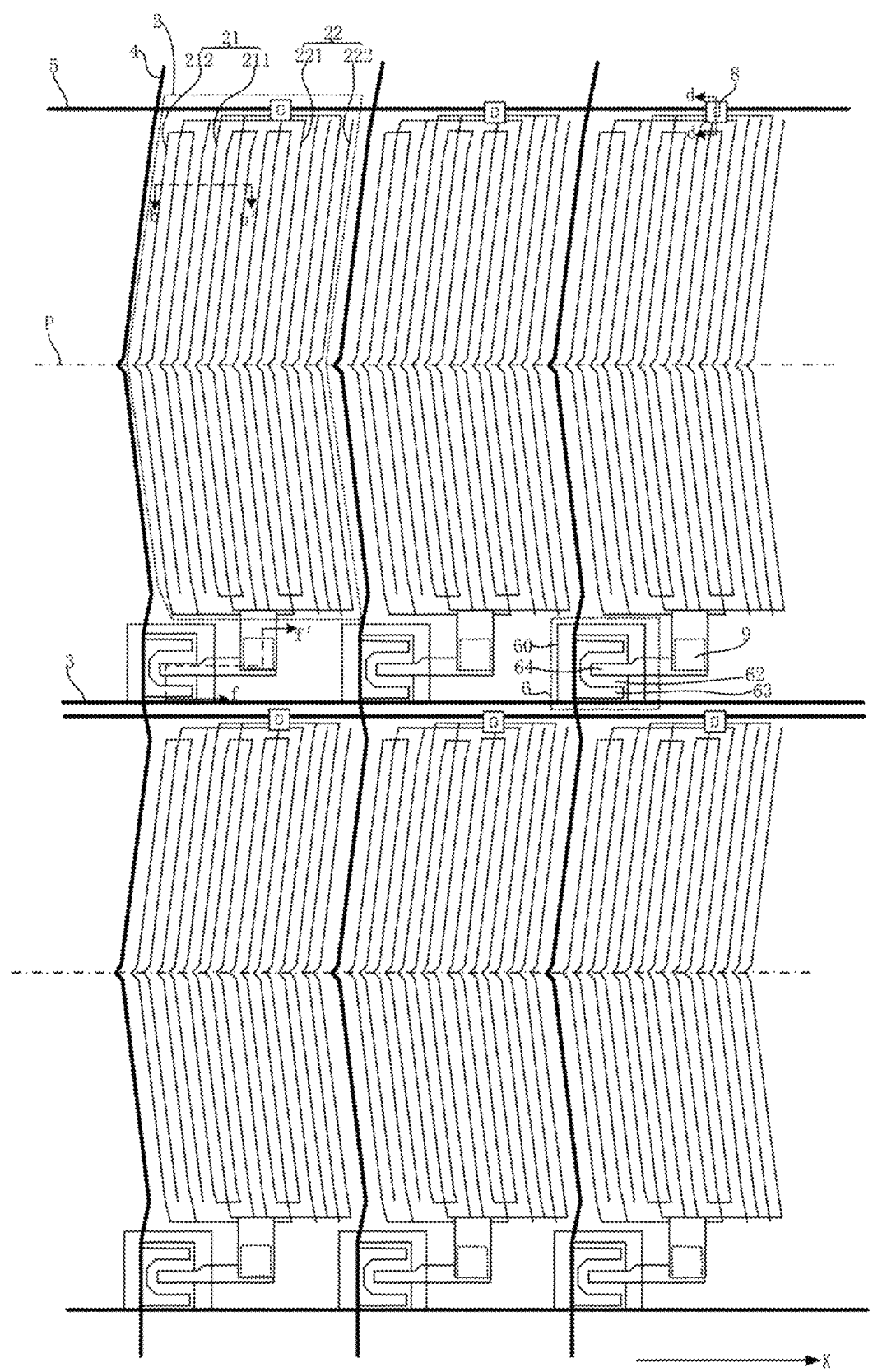
FIG. 3A is a top view illustrating a part of a structure of a display substrate according to an embodiment of the present disclosure.
Figure 3B:
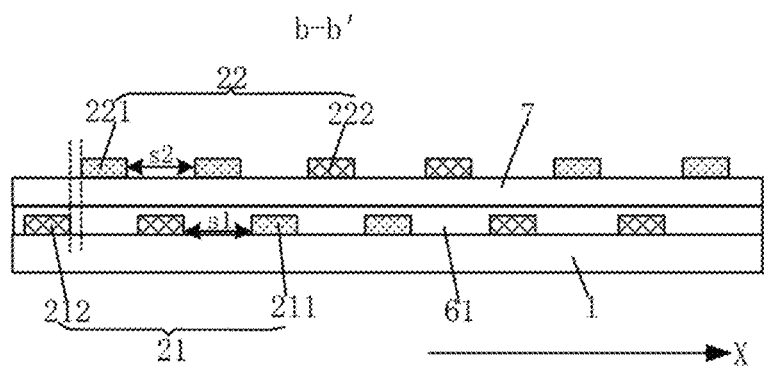
FIG. 3B is a cross-sectional view illustrating a structure taken along a section line bb' in FIG. 3A.

In view of the above problems in the prior art, in a first aspect, a display substrate is provided according to an embodiment of the present disclosure. FIG. 2A is a top view illustrating a part of a structure of the display substrate according to an embodiment of the present disclosure; FIG. 2B is a cross-sectional view of a structure taken along a section line aa' in FIG. 2A; FIG. 3A is a top view illustrating a part of a structure of a display substrate according to an embodiment of the present disclosure; FIG. 3B is a cross-sectional view illustrating a structure taken along a section line bb' in FIG. 3A. Referring to FIGS. 2A, 2B, 3A, and 3B, the display substrate includes a base substrate 1, and a plurality of sub-pixels 2 arranged on the base substrate 1 in an array. The sub-pixel 2 includes a lower electrode 21 and an upper electrode 22, and the lower electrode 21 and the upper electrode 22 are sequentially stacked in a direction away from the base substrate 1. The lower electrode 21 includes a plurality of first electrode strips 211 and a plurality of second electrode strips 212. The upper electrode 22 includes a plurality of third electrode strips 221 and a plurality of fourth electrode strips 222. The first electrode strip 211 is electrically connected to the third electrode strip 221. The second electrode strip 212 is electrically connected to the fourth electrode strip 222. Two adjacent electrode strips in the first electrode strips 211 and/or the second electrode strips 212 are spaced apart from each other. Two adjacent electrode strips in the third electrode strips 221 and/or the fourth electrode strips 222 are spaced apart from each other. M number of sequentially adjacent first electrode strips 211 and N number of sequentially adjacent second electrode strips 212 are alternately arranged; M number of sequentially adjacent third electrode strips 221 and N number of sequentially adjacent fourth electrode strips 222 are alternately arranged; where M=1, 2, 3, . . . ; N=1, 2, 3, . . . ; and M and N are integers. Orthographic projections of the electrode strips of the upper electrode 22 and the electrode strips of the lower electrode 21 on the base substrate 1 are alternately arranged. The first electrode strip 211 (or the second electrode strip 212) and the fourth electrode strip 222 (or the third electrode strip 221) are each arranged at a first place in a first direction X, where the first direction X is a direction of arranging the first electrode strips 211 and the second electrode strips 212 and a direction of arranging the third electrode strips 221 and the fourth electrode strips 222.

In some embodiments, the first electrode strips 211, the second electrode strips 212, the third electrode strips 221, and the fourth electrode strips 222 are parallel to each other.

In some embodiments, M=N; M≤3; and N≤3.

In some embodiments, referring to FIGS. 2A and 2B, M=N=1.

In some embodiments, referring to FIGS. 3A and 3B, M=N=2. As it should be, the number of the electrode strips is not limited in the present disclosure, and may be designed according to actual requirements.

In some embodiments, referring to FIGS. 2B and 3B, an orthographic projection of one electrode strip of the lower electrode 21 on the base substrate 1 is between orthographic projections of two adjacent electrode strips of the upper electrode 22 on the base substrate 1. Similarly, an orthographic projection of one electrode strip of the upper electrode 22 on the base substrate 1 is between orthographic projections of two adjacent electrode strips of the lower electrode 21 on the base substrate 1. The orthographic projections of the electrode strips of the upper electrode 22 and the electrode strips of the lower electrode 21 on the base substrate 1 do not overlap each other. With such an arrangement, a uniform and symmetrical electric field may be formed between the upper electrode 22 and the lower electrode 21, so as to eliminate the problem of nonuniform distribution of the electric field in the liquid crystal display substrate, thereby eliminating the problem of asymmetric VT (voltage-transmittance) curve of the display panel in an ADS display mode in the prior art, and improving the display transmittance and even the display effect of the display substrate.

Figure 2C:
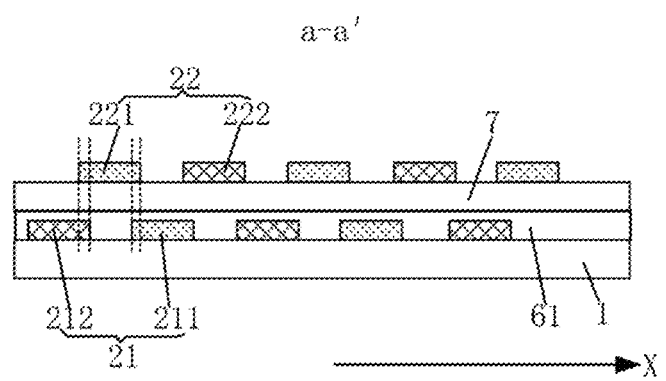
FIG. 2C is a cross-sectional view illustrating a structure taken along a section line aa' in FIG. 2A.
Figure 3C:
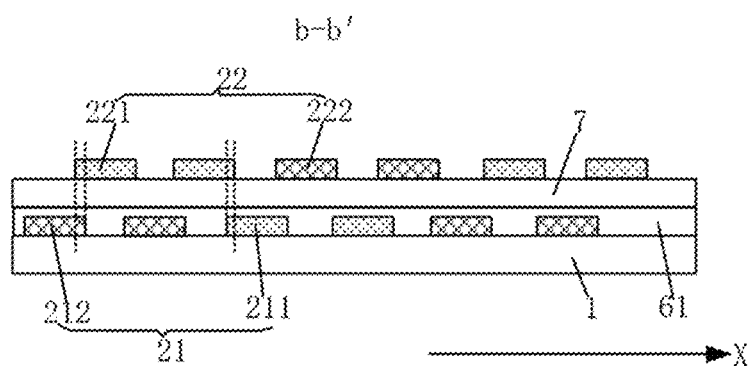
FIG. 3C is a cross-sectional view illustrating a structure taken along a section line bb' in FIG. 3A.

FIG. 2C is a cross-sectional view illustrating a structure taken along a section line aa' in FIG. 2A; FIG. 3C is a cross-sectional view of a structure taken along a section line bb' in FIG. 3A. In some embodiments, referring to FIGS. 2C and 3C, alternatively the orthographic projections of the electrode strips of the upper electrode 22 and the electrode strips of the lower electrode 21 on the base substrate 1 may partially overlap each other. For example, with respect to one electrode strip of the upper electrode 22 and one electrode strip of the lower electrode 21, which have adjacent orthographic projections on the base substrate 1, the orthographic projection of the electrode strip of the upper electrode 22 on the base substrate 1 overlaps an orthographic projection of an adjacent edge of the electrode strip of the lower electrode 21 on the base substrate 1; for example, it is possible that an orthographic projection of the third electrode strip 221 on the base substrate 1 overlaps an orthographic projection of an adjacent edge of the second electrode strip 212 on the base substrate 1; it is also possible that the orthographic projection of the third electrode strip 221 on the base substrate 1 overlaps an orthographic projection of an adjacent edge of the first electrode strip 211 on the base substrate 1; it is also possible that an orthographic projection of fourth electrode strip 222 on the base substrate 1 overlaps an orthographic projection of an adjacent edge of the second electrode strip 212 on the base substrate 1.

In some embodiments, the widths of the first electrode strip 211 and the second electrode strip 212 are equal to each other; and a first spacing s1 between any two adjacent electrode strips in the first electrode strips 211 and/or the second electrode strips 212 is equal.

In some embodiments, the widths of the third electrode strips 221 and the fourth electrode strips 222 are equal to each other; and a second spacing s2 between any two adjacent electrode strips in the third electrode strips 221 and/or the fourth electrode strips 222 is equal.

In some embodiments, the widths of the first electrode strips 211 and the third electrode strips 221 are equal to each other; and/or the first spacing s1 and the second spacing s2 are equal to each other.

In some embodiments, a ratio of the width of the first electrode strip 211 to the first spacing s1 is in a range from 1/3 to 3/4; and a ratio of the width of the third electrode strip 221 to the second spacing s2 is in a range from 1/3 to 3/4.

In some embodiments, the width of each of the first electrode strips 211 and the second electrode strips 212 is in a range from 2 μm to 3 μm; and the first spacing s1 is in a range from 4 μm to 6 μm.

In some embodiments, the width of each of the first electrode strips and the second electrode strips is in a range from 2.2 μm to 2.9 μm; and the first spacing s1 is in a range from 4.8 μm to 5.8 μm.

In some embodiments, the width of each of the third electrode strips 221 and the fourth electrode strips 222 is in a range from 2 μm to 3 μm; and the second spacing s2 is in a range from 4 μm to 6 μm.

In some embodiments, the width of each of the third electrode strips 221 and the fourth electrode strips 222 is in a range from 2.2 μm to 2.9 μm; and the second spacing s2 is in a range from 4.8 μm to 5.8 μm.

In some embodiments, referring to FIGS. 2A and 3A, the display substrate further includes a plurality of gate lines 3, a plurality of data lines 4, a plurality of common electrode lines 5, and a plurality of switching transistors 6. The gate line 3 is located between two adjacent rows of sub-pixels 2. The data line 4 is located between two adjacent columns of sub-pixels 2. The common electrode line 5 is located between two adjacent rows of sub-pixels 2. The gate line 3 connecting to the sub-pixels 2 in a same row and the common electrode line 5 connecting to the sub-pixels 2 in the same row are located on two sides of the sub-pixels 2 in the same row in an extending direction of the data line 4. The gate lines 3 and the data lines 4 are spatially crossed to form a plurality of pixel regions. Lengths of the first electrode strips 211, the second electrode strips 212, the third electrode strips 221, and the fourth electrode strips 222 extend along the extending direction of the data line 4.

A plurality of sub-pixels 2 are located in the plurality of pixel regions, respectively, in a one-to-one correspondence. The plurality of switching transistors 6 are in the plurality of pixel regions, respectively, in a one-to-one correspondence, and the switching transistor 6 is located at a position where the gate line 3 and the data line 4 cross each other. The switching transistor 6 includes a gate 60, an active layer 62, a source 63 and a drain 64. The gate 60 is connected to the gate line 3. The source 63 is connected to the data line 4. The drain 64 is connected to the fourth electrode strips 222 in the upper electrode 22 and the second electrode strips 212 in the lower electrode 21. When a scan signal is input to the gate line 3, the switching transistor 6 is turned on, and a data voltage signal in the data line 4 is input to the fourth electrode strip 222 in the upper electrode 22 and the second electrode strip 212 in the lower electrode 21. The third electrode strips 221 in the upper electrode 22 and the first electrode strips 211 in the lower electrode 21 are connected to the common electrode line 5, which provides a common voltage signal for the third electrode strips 221 and the first electrode strips 211. An electric field is formed between the upper electrode 22 and the lower electrode 21 to drive liquid crystal molecules in the display substrate to deflect, so that the display substrate displays.

Figure 2D:
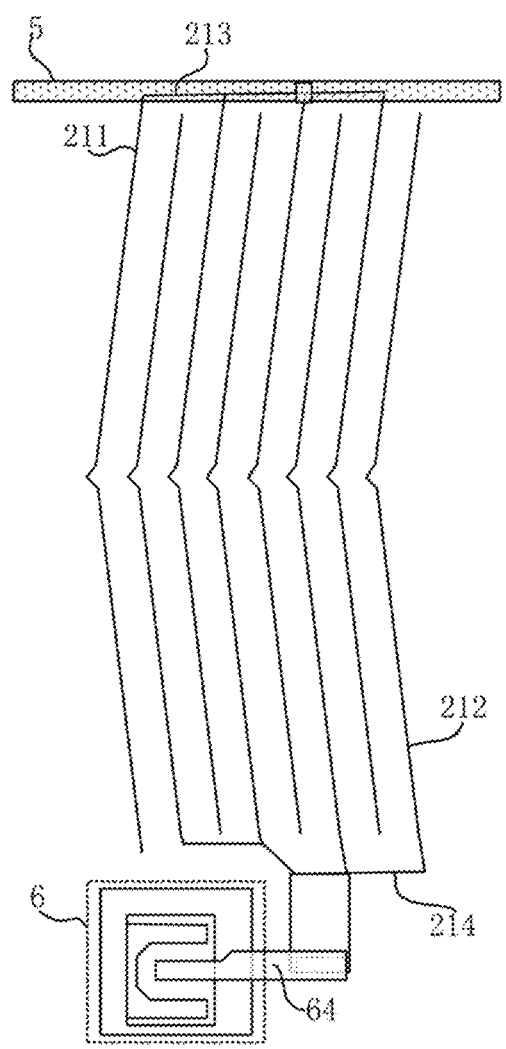
FIG. 2D is a top view illustrating a structure of a lower electrode in FIG. 2A.
Figure 3D:
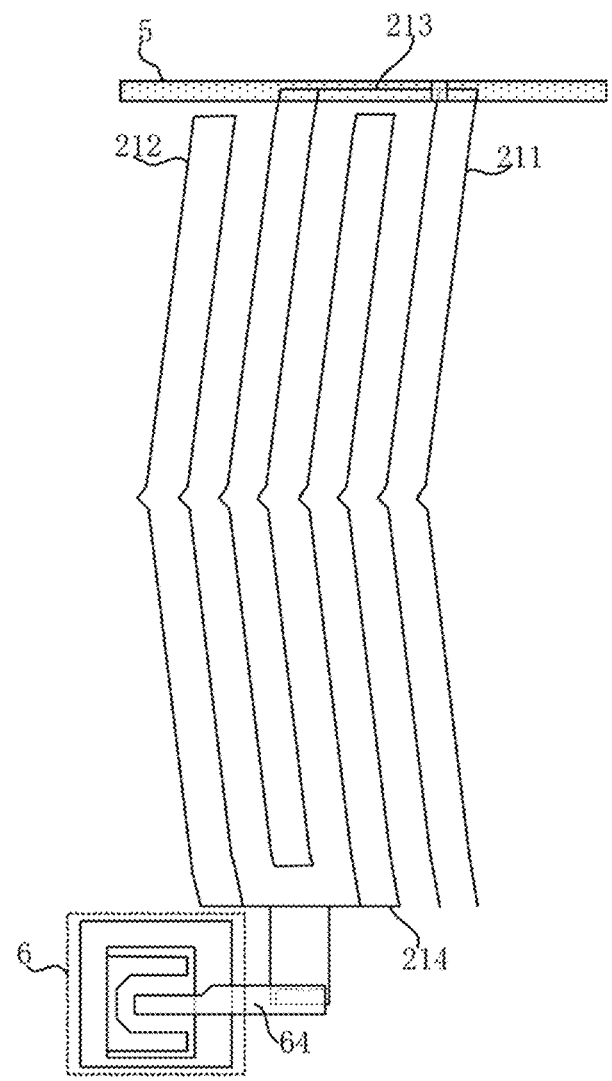
FIG. 3D is a top view illustrating a structure of a lower electrode in FIG. 3A.

FIG. 2D is a top view illustrating a structure of the lower electrode in FIG. 2A; and FIG. 3D is a top view illustrating a structure of the lower electrode in FIG. 3A. In some embodiments, referring to FIGS. 2D and 3D, the lower electrode 21 further includes a first connection part 213 and a second connection part 214. The first connection part 213 is located at an end of the first electrode strip 211 close to the common electrode line 5, and the first connection part 213 is connected to the first electrode strip 211 and the common electrode line 5. Optionally, the first connection part 213 may be directly electrically connected to the common electrode line 5 through lapping. For example, in a manufacturing process, first, a patterned lower electrode 21 is formed, then, the common electrode line 5 is formed. In this case, the first connection part 213 and the common electrode line 5 overlap each other, and the overlapped parts may be directly electrically connected together. In this case, in the manufacturing process, the gate line 3, the lower electrode 21 and the first connection part 213 may be arranged in the same layer, and then, the common electrode line 5 is deposited. The second connection part 214 is located at an end of the second electrode strip 212 close to the gate line 3, and the second connection part 214 is connected to the second electrode strip 212 and the drain 64 of the switching transistor 6. Referring to FIG. 2D, the second connection part 214 includes a bulge extending toward the gate line 3, and the bulge is electrically connected to the drain 64.

Figure 2E:
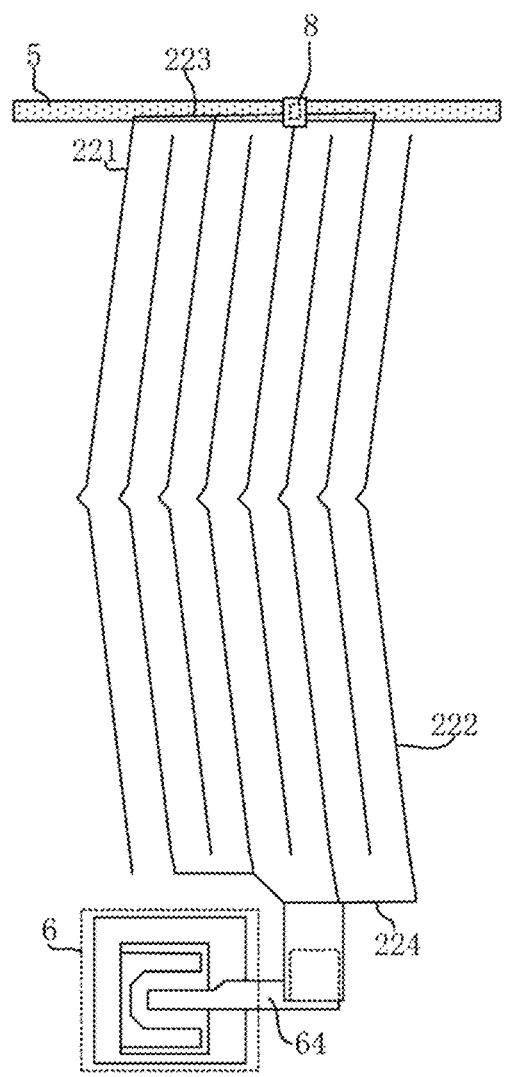
FIG. 2E is a top view illustrating a structure of an upper electrode in FIG. 2A.
Figure 3E:
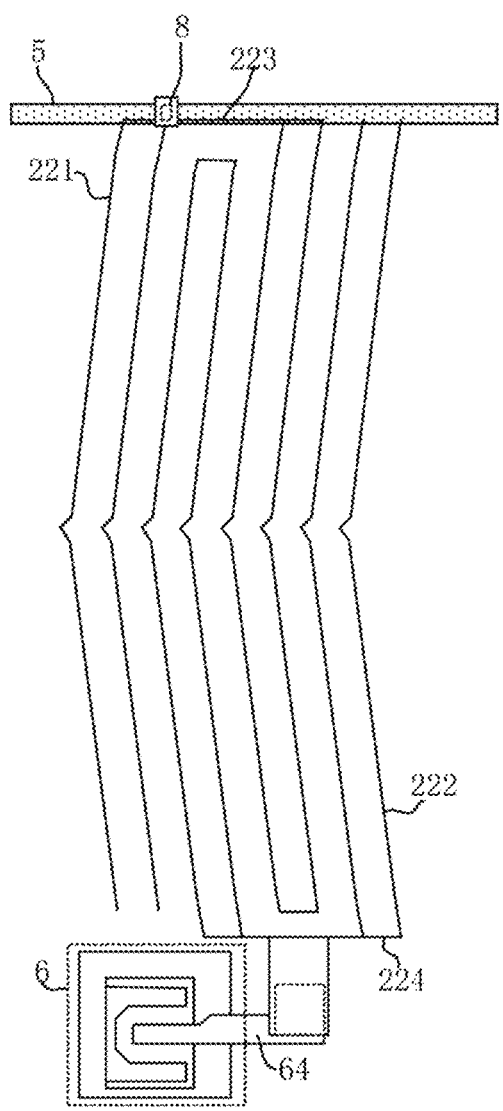
FIG. 3E is a top view illustrating a structure of an upper electrode in FIG. 3A.

FIG. 2E is a top view illustrating a structure of the upper electrode in FIG. 2A; and FIG. 3E is a top view illustrating a structure of the upper electrode in FIG. 3A. In some embodiments, referring to FIGS. 2E and 3E, the upper electrode 22 further includes a third connection part 223 and a fourth connection part 224. The third connection part 223 is located at an end of the third electrode strip 221 close to the common electrode line 5, a first via 8 is provided in the insulating layer under the third connection part 223, and the third connection part 223 is electrically connected to the first connection part 213 of the lower electrode 21 through the first via 8 in the insulating layer. Optionally, in the process, subsequent to depositing the film layer of the first connection part 213, an insulating layer is deposited, where the number of layers of the insulating layer is not limited. Subsequent to depositing the insulating layer, the first via 8 is formed in the insulating layer. Where the insulating layer is a multilayer, each layer may be perforated, and finally the vias overlap each other and finally are communicated with each other. Alternatively, after the last insulating layer is formed, one perforation process may be performed, which is not limited herein. Subsequent to forming a via in the insulating layer, the upper electrode 22 is deposited, where a part of the material of the third electrode strip 221 of the upper electrode 22 is deposited into the first via 8 in the insulating layer, so that the third electrode strip 221 is electrically connected to the first electrode strip 211 of the lower electrode 21. Since the first electrode strip 211 is electrically connected to the common electrode line 5, the third electrode strip 221 and the first electrode strip 211 are both electrically connected to the common electrode line 5. Here, the third connection part 223 is connected to the third electrode strip 221 and the common electrode line 5. The fourth connection part 224 is located at an end of the fourth electrode strip 222 close to the gate line 3, and the fourth connection part 224 is connected to the fourth electrode strip 222 and the drain 64 of the switching transistor 6. Referring to FIG. 2E, the fourth connection part 224 includes a bulge extending toward the gate line 3, and the bulge and the drain 64 may be electrically connected together through the first via 8 in the insulating layer.

It should be noted that the line widths in the drawings are only schematic line widths, and do not represent actual line widths in actual processes.

In some embodiments, referring to FIGS. 2D and 3D, the length of the first connection part 213 extends along an extending direction of the common electrode line 5. The first connection part 213 is connected to the plurality of first electrode strips 211 to form a comb-shaped structure. The length of the second connection part 214 extends along an extending direction of the gate line 3. The second connection part 214 is connected to the plurality of second electrode strips 212 to form a comb-shaped structure.

An included angle greater than 0° is formed between the extending direction of the first connection part 213 and the extending direction of the first electrode strips 211, so that the first connection part 213 is connected to the plurality of first electrode strips 211 with the same extending direction, to form a comb-shaped structure. That is, the first connection part 213 corresponds to a comb handle of the comb-shaped structure, and the plurality of first electrode strips 211 correspond to comb teeth of the comb-shaped structure. An included angle greater than 0° is formed between the extending direction of the second connection part 214 and the extending direction of the second electrode strips 212, so that the second connection part 214 is connected to the plurality of second electrode strips 212 with the same extending direction, to form a comb-shaped structure. That is, the second connection part 214 corresponds to a comb handle of the comb-shaped structure, and the plurality of second electrode strips 212 correspond to comb teeth of the comb-shaped structure.

In some embodiments, referring to FIGS. 2E and 3E, the length of the third connection part 223 extends along the extending direction of the common electrode line 5. The third connection part 223 is connected to the plurality of third electrode strips 221 to form a comb-shaped structure. The length of the fourth connection part 224 extends along the extending direction of the gate line 3. The fourth connection part 224 is connected to the plurality of fourth electrode strips 222 to form a comb-shaped structure.

An included angle greater than 0° is formed between the extending direction of the third connection part 223 and the extending direction of the third electrode strips 221, so that the third connection part 223 is connected to the plurality of third electrode strips 221 with the same extending direction, to form a comb-shaped structure. That is, the third connection part 223 corresponds to a comb handle of the comb-shaped structure, and the plurality of third electrode strips 221 correspond to comb teeth of the comb-shaped structure. An included angle greater than 0° is formed between the extending direction of the fourth connection part 224 and the extending direction of the fourth electrode strips 222, so that the fourth connection part 224 is connected to the plurality of fourth electrode strips 222 with the same extending direction, to form a comb-shaped structure. That is, the fourth connection part 224 corresponds to a comb handle of the comb-shaped structure, and the plurality of fourth electrode strips 222 correspond to comb teeth of the comb-shaped structure.

Figure 4:
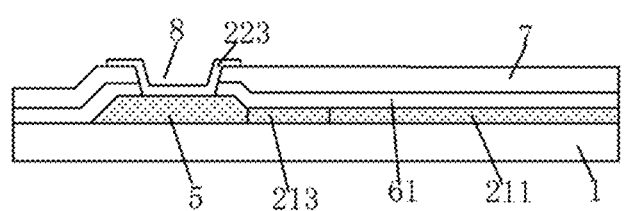
FIG. 4 is a cross-sectional view illustrating a structure taken along a section line cc' in FIG. 2A and a section line dd' in FIG. 3A.
Figure 5:
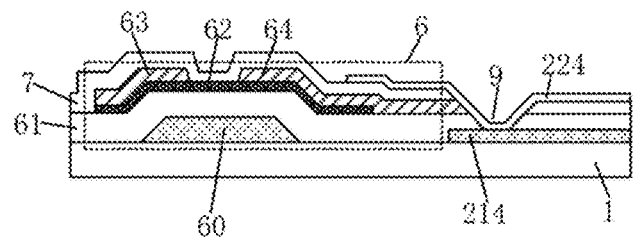
FIG. 5 is a cross-sectional view illustrating a structure taken along a section line ee' in FIG. 2A and a section line ff' in FIG. 3A.

In some embodiments, referring to FIGS. 4 and 5, FIG. 4 is a cross-sectional view illustrating a structure taken along a section line cc' in FIG. 2A and a line dd' in FIG. 3A; and FIG. 5 is a cross-sectional view illustrating a structure taken along a section line ee' in FIG. 2A and a line ff' in FIG. 3A. Referring to FIGS. 4 and 5, the gate 60 of the switching transistor 6, the gate line 3, the common electrode line 5, and the lower electrode 21 are located on the base substrate 1. The active layer 62 of the switching transistor 6 is located on a side of the gate 60 away from the base substrate 1, and a gate insulating layer 61 is further arranged between the gate 60 and the active layer 62. The source 63 and the drain 64 of the switching transistor 6 are located on a side of the active layer 62 away from the base substrate 1, and are arranged at two opposite ends of the active layer 62, respectively. The upper electrode 22 is located at a side of the source 63 and the drain 64 away from the base substrate 1, and a passivation layer 7 is further arranged between the upper electrode 22 and the source 63 and the drain 64. The gate insulating layer 61 and the passivation layer 7 also each extend between the lower electrode 21 and the upper electrode 22. The first connection part 213 and the common electrode line 5 are formed integrally into a one-piece structure. The orthographic projection of the third connection part 223 on the base substrate 1 at least partially overlaps the orthographic projection of the common electrode line 5 on the base substrate 1. The passivation layer 7 and the gate insulating layer 61 are provided with the first via 8 at a region where the orthographic projections of the third connection part 223 and the common electrode line 5 on the base substrate 1 overlap each other, and the third connection part 223 is connected to the common electrode line 5 through the first via 8.

The gate 60 of the switching transistor 6, the gate line 3, the common electrode line 5 and the lower electrode 21 are located on the base substrate 1, and the first connection part 213 and the common electrode line 5 are formed integrally into a one-piece structure. The gate 60, the gate line 3, the common electrode line 5 and the lower electrode 21 may be manufactured through one patterning process, so that the procedure of manufacturing the display substrate is simplified, and the manufacturing cost of the display substrate is reduced.

In some embodiments, referring to FIG. 5, a part of the second connection part 214 extends such that an orthographic projection of the second connection part 214 on the base substrate 1 overlaps an orthographic projection of the drain 64 on the base substrate 1. A part of the fourth connection part 224 extends such that an orthographic projection of the fourth connection part 224 on the base substrate 1 overlaps the orthographic projection of the drain 64 on the base substrate 1. The passivation layer 7 and the gate insulating layer 61 are provided with a second via 9 at a region where orthographic projections of the second connection part 214, the fourth connection part 224 and the drain 64 on the base substrate 1 overlap each other, and the fourth connection part 224 is connected to the drain 64 and the second connection part 214 through the second via 9.

Figure 6:
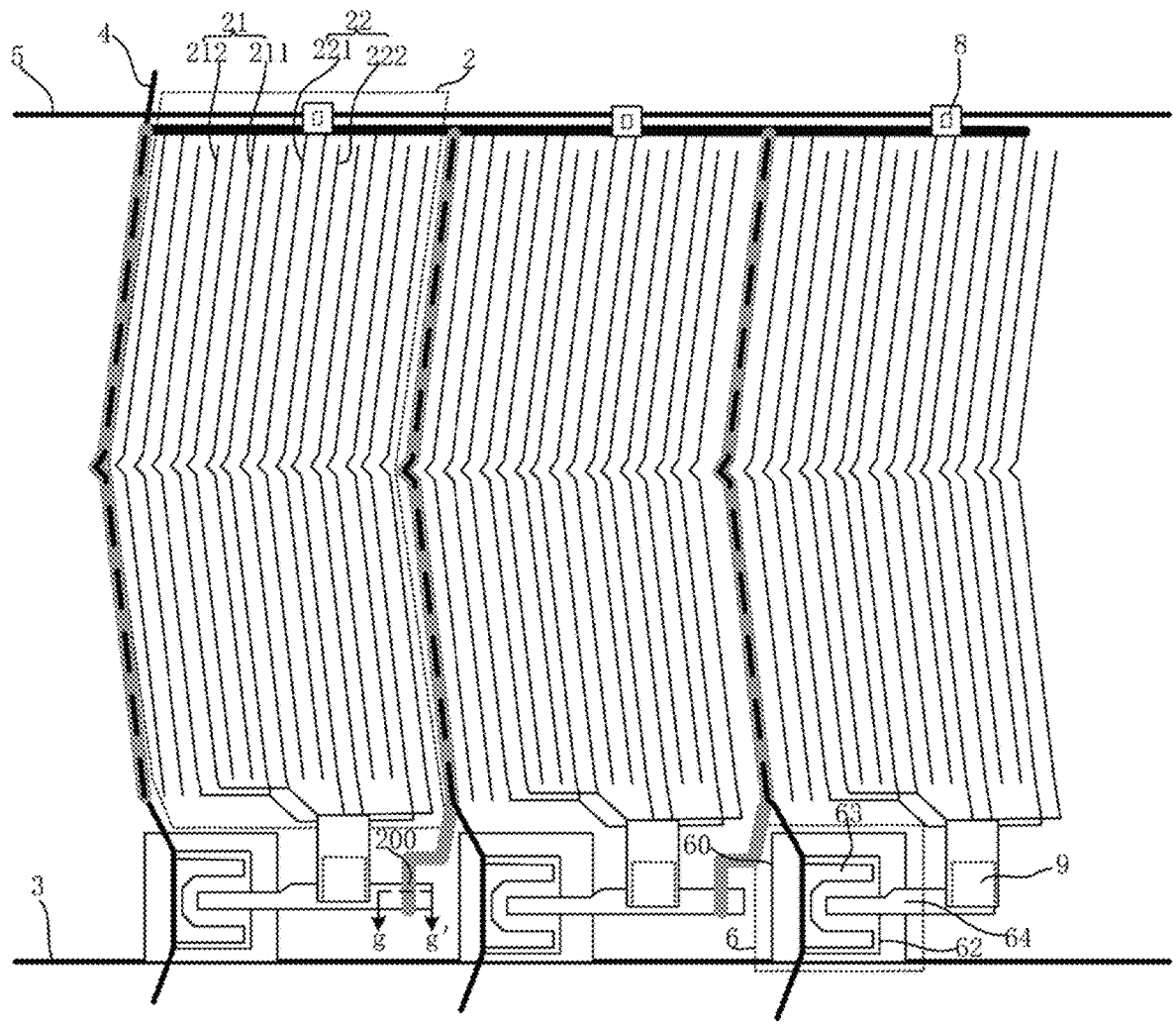
FIG. 6 is a top view illustrating a part of a structure of a display substrate according to an embodiment of the present disclosure.
Figure 7:
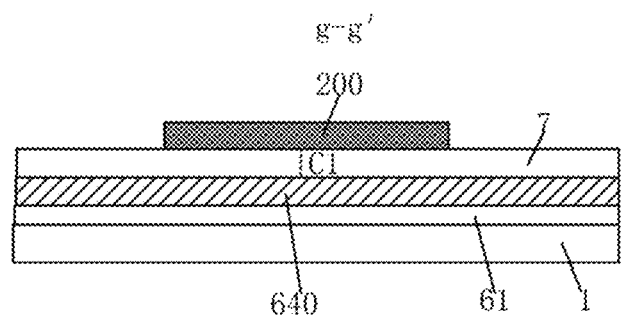
FIG. 7 is a cross-sectional view illustrating a structure taken along a section line gg' in FIG. 6.

FIG. 6 is a top view illustrating a part of a structure of a display substrate according to an embodiment of the present disclosure; and FIG. 7 is a cross-sectional view illustrating a structure taken along a section line gg' in FIG. 6. In some embodiments, referring to FIGS. 6 and 7, the third electrode strip 221 at an edge of the upper electrode 22 extend toward the drain 64 to form a first sub-portion 200. The drain 64 extends toward the first sub-portion 200 to form a second sub-portion 640. Orthographic projections of the first sub-portion 200 and the second sub-portion 640 on the base substrate 1 overlap each other, thereby forming a first compensation capacitor C1. The first compensation capacitor C1 can compensate for the decreased storage capacitance (i.e., the storage capacitance in the pixel circuit originally formed by the opposite area between the slit-shaped upper electrode and the planar lower electrode) due to that the upper electrode 22 and the lower electrode 21 are both formed by the electrode strips, thereby ensuring the normal display of the respective sub-pixels 2 in the display substrate and ensuring the display effect thereof.

Figure 8:
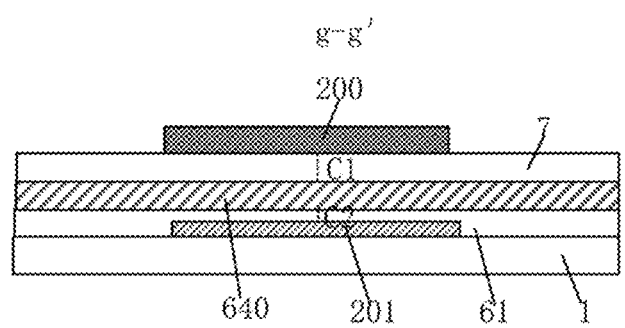
FIG. 8 is a cross-sectional view illustrating a structure taken along a section line gg' in FIG. 6.

FIG. 8 is a cross-sectional view illustrating a structure taken along a section line gg' in FIG. 6. In some embodiments, referring to FIG. 8, the first electrode strip 211 at the edge of the lower electrode 21 extend toward the drain 64 to form a third sub-portions 201. Orthographic projections of the third sub-portion 201 and the second sub-portion 640 on the base substrate 1 overlap each other, thereby forming a second compensation capacitor C2. That is, the total compensation capacitor in the structure in FIG. 8 is a superposition of the first compensation capacitor C1 and the second compensation capacitor C2. That is, a total compensation capacitance is the sum of capacitances of the first compensation capacitor C1 and the second compensation capacitor C2, so that the decreased storage capacitance due to that the upper electrode 22 and the lower electrode 21 are both formed by the electrode strips can be further compensated, thereby further ensuring the normal display of the respective sub-pixels 2 in the display substrate and ensuring the display effect thereof.

In some embodiments, referring to FIG. 6, the orthographic projection of the third electrode strip 221 at the edge of the upper electrode 22 on the base substrate 1 overlaps the orthographic projection of the data line 4 on the base substrate 1. A width of the third electrode strip 221 at the edge of the upper electrodes 22, which has an orthographic projection on the base substrate 1 overlapping the orthographic projection of the data line 4 on the base substrate 1, is greater than a width of the third electrode strip 221 located in the pixel region. The third electrode strip 221 having a wider width may shield the data signal in the data line 4, to prevent the data voltage signal in the data line 4 from interfering with the liquid crystal, so that a width of the black matrix on the data line 4 may be reduced.

In some embodiments, the third electrode strip 221 at the edge of the upper electrode 22, which has the orthographic projection on the base substrate 1 overlapping the orthographic projection of the data line 4 on the base substrate 1, is connected to the third connection parts 223, and the third connection parts 223 of the sub-pixels 2 in the same row arranged along the first direction X are connected to each other, to form a straight line. The straight line formed by connecting the third connection parts 223 together overlaps the common electrode line 5, and is connected to the common electrode line 5 through the first vias 8 formed in the passivation layer 7 and the gate insulating layer 61.

It should be noted that, in the display substrate in FIGS. 2A and 3A, a third electrode strip 221, which has the orthographic projection on the base substrate 1 overlapping the orthographic projection of the data line 4 on the base substrate 1, may further be arranged at the edge of the upper electrode 22, and the width of this third electrode strip 221 may be greater than or equal to the width of the third electrode strip 221 located in the pixel region. Similarly, the third electrode strip 221 with a wider width may shield the data signal in the data line 4, to prevent the data voltage signal in the data line 4 from interfering with the liquid crystal, so that the width of the black matrix on the data line 4 may be reduced.

In some embodiments, based on the above structural arrangement of the display substrate, the orthographic projection of the first electrode strip at the edge of the lower electrode on the base substrate overlaps the orthographic projection of the data line on the base substrate. The width of the first electrode strip at the edge of the lower electrode, which has an orthographic projection on the base substrate overlapping the orthographic projection of the data line on the base substrate, is greater than the width of the first electrode strip located in the pixel region. The first electrode strip with a wider width may shield the data signal in the data line, to prevent the data voltage signal in the data line 4 from interfering with the liquid crystal, so that the width of the black matrix on the data line 4 may be reduced.

In some embodiments, referring to FIGS. 2A and 3A, the sub-pixel 2 is divided into two domains along the extending direction of the data line 4. A domain boundary P (i.e., a boundary between the two domains) extends in the extending direction of the gate line 3. The part of the data line 4 near the domain boundary P is bent in a direction approaching the domain boundary P. The parts of the first electrode strip 211, the second electrode strip 212, the third electrode strip 221, and the fourth electrode strip 222 near the domain boundary lines P are each bent in the direction approaching the domain boundary line P, and the bent shapes thereof are each matched with the bent shape of the data lines 4. The dual domain structure can improve viewing angle and eliminate color shift.

The parts of the data line 4 located on the upper and lower sides of the domain boundary P are bent in the direction approaching the domain boundary P, to form a small arrow. The parts of each of the first electrode strip 211, the second electrode strip 212, the third electrode strip 221, and the fourth electrode strip 222 located on the upper and lower sides of the domain boundary P are also bent as approaching the domain boundary P, and the parts of the entire electrode strip located on the upper and lower sides of the domain boundary P are bent as approaching the domain boundary P to form a small arrow. The small arrow of the data line 4 and the small arrow of each electrode strip are bent towards the same direction, and both of them have a same or similar shape, and are located at positions corresponding to each other.

Figure 9:
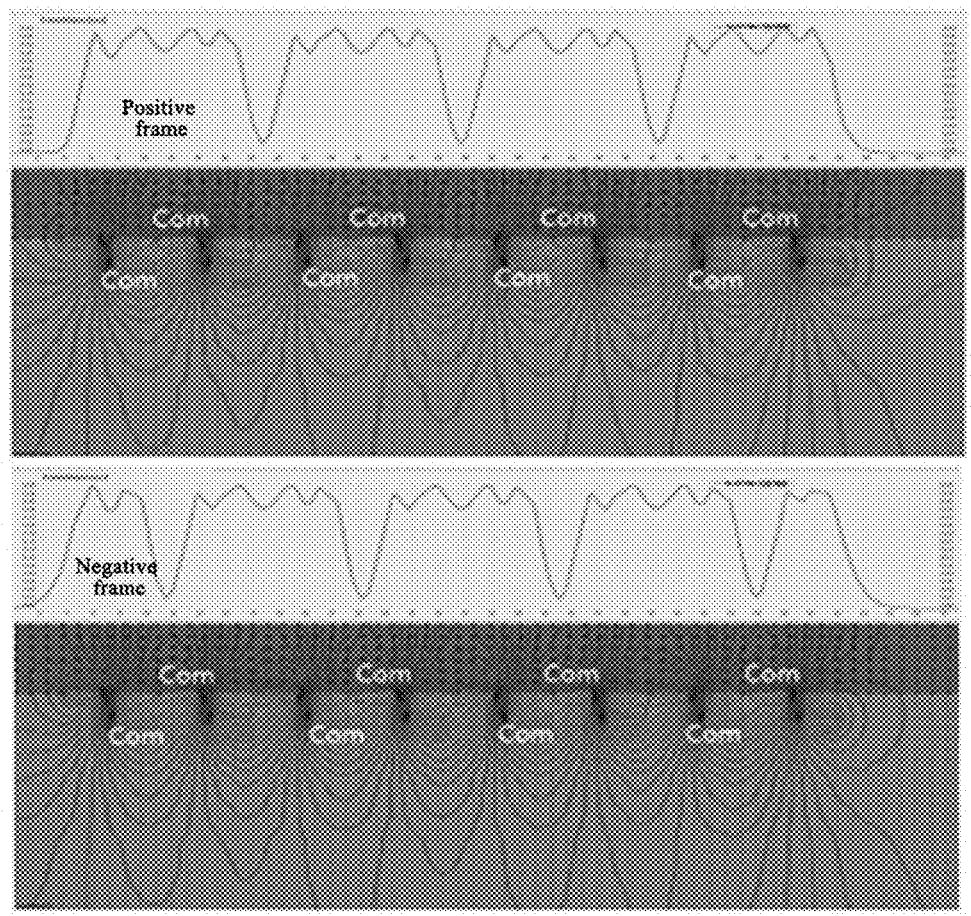
FIG. 9 is a schematic diagram illustrating a difference between optical effects of the display substrate in FIG. 2A in positive and negative frames.
Figure 10:
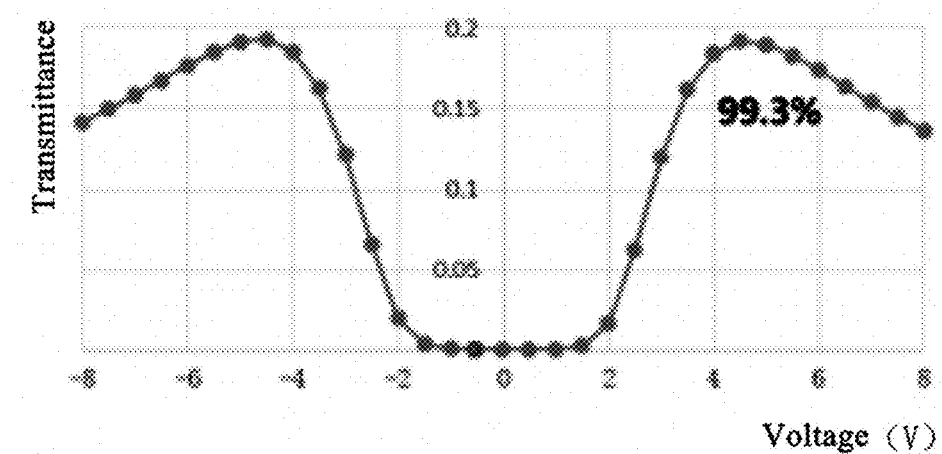
FIG. 10 is a simulated VT curve of the display substrate in FIG. 2A when displaying.

In the embodiment of the present disclosure, referring to FIG. 9, which is a schematic diagram illustrating a difference between optical effects (i.e., a difference between transmittances) of the display substrate in FIG. 2A in positive and negative frames, as can be seen from FIG. 9, under the condition of the electric field generated by the electrodes in FIG. 2A, the number of dark regions is reduced, the transmittance curves of the positive and negative frames only translate relative to each other, and the morphologies of the transmittance curves of the positive and negative frames are substantially the same. Referring to FIG. 10, which is a simulated VT (i.e., voltage-transmittance) curve of the display substrate in FIG. 2A when displaying, the simulation results are as follows: the difference proportion between the positive and negative frame transmittances is 99.3%; compared with the electrode design scheme of the ADS display mode in the prior art, the symmetry of the positive and negative frame transmittances of the display substrate in FIG. 2A is improved by 2%, and transmittance curves of the positive and negative frames are approximately coincident with each other. As can be seen from the VT curve in FIG. 10, the VOP voltage (the data voltage corresponding to the point with the highest transmittance in the VT curve) of the display substrate in FIG. 2A is 4.5V. Compared with the electrode design scheme of the ADS display mode in the prior art, the VOP voltage is lower, and the power consumption is reduced.

Figure 11:
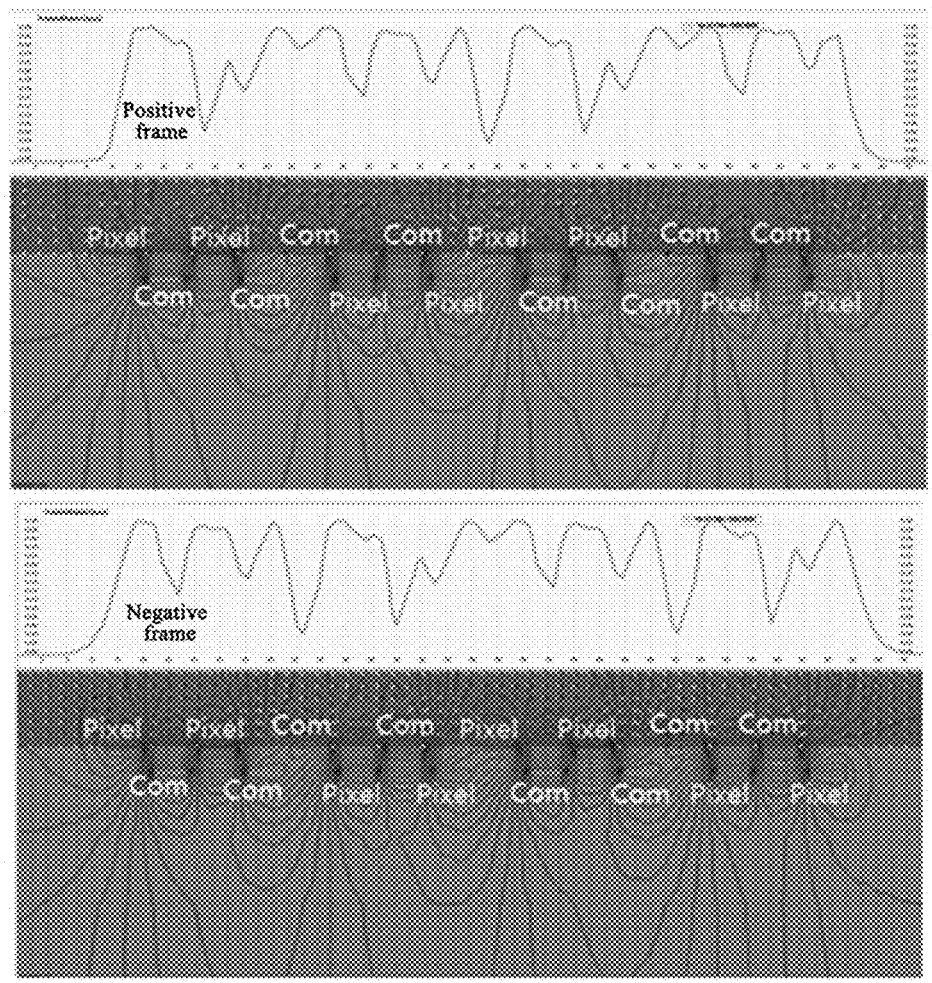
FIG. 11 is a schematic diagram illustrating a difference between optical effects of the display substrate in FIG. 3A in positive and negative frames.
Figure 12:
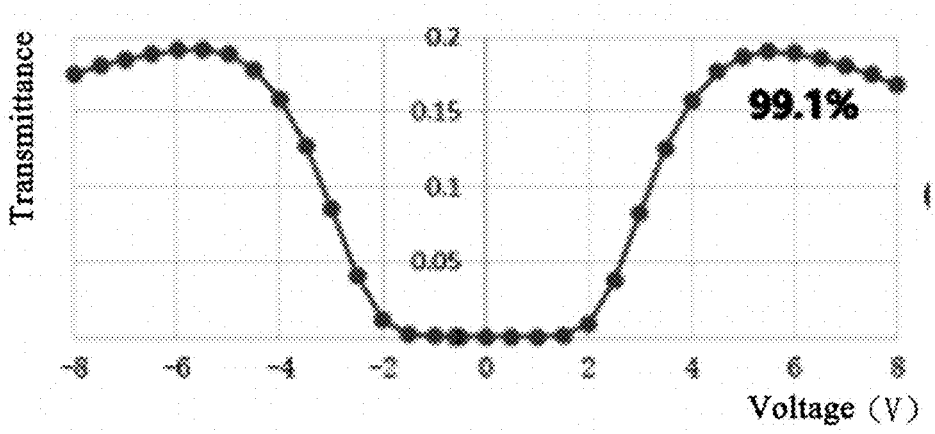
FIG. 12 is a simulated VT curve of the display substrate in FIG. 3A when displaying.

Referring to FIG. 11, which is a schematic diagram illustrating a difference between optical effects (i.e., a difference between transmittances) of the display substrate in FIG. 3A in positive and negative frames, as can be seen from FIG. 11, under the condition of the electric field generated by the electrodes in FIG. 3A, distribution of the dark regions is weakened, the transmittance curves of the positive and negative frames also only translate relative to each other, and the morphologies of the transmittance curves of the positive and negative frames are substantially the same. Referring to FIG. 12, which is a simulated VT (i.e., voltage-transmittance) curve of the display substrate in FIG. 3A when displaying, the simulation results are as follows: the difference proportion between the positive and negative frame transmittances is 99.1%, compared with the electrode design scheme of the ADS display mode in the related art, the symmetry of the positive and negative frame transmittances is improved by 1.8%, and the positive and negative frame transmittance curves are approximately coincident with each other. As can be seen from the VT curve in FIG. 12, the VOP voltage (the data voltage corresponding to the point with the highest transmittance in the VT curve) of the display substrate in FIG. 3A is 5.5V. Compared with the electrode design scheme of the ADS display mode in the prior art, the VOP voltage is also lower, and the purpose of reducing power consumption can be also achieved.

In summary, in the display substrate according to an embodiment of the present disclosure, the M number of sequentially adjacent first electrode strips 211 and the N number of sequentially adjacent second electrode strips 212 are alternately arranged; the M number of sequentially adjacent third electrode strips 221 and the N number of sequentially adjacent fourth electrode strips 222 are alternately arranged; and the orthographic projections of the electrode strips of the upper electrode 22 and the electrode strips of the lower electrode 21 on the base substrate 1 are alternately arranged, so that a uniform and symmetrical electric field may be formed between the upper electrode 22 and the lower electrode 21, so as to improve the problem of nonuniform distribution of the electric field in the liquid crystal display substrate, thereby improving the problem of asymmetric VT (voltage-transmittance) curve of the display panel in ADS display mode in the prior art, and improving the display transmittance and even the display effect of the display substrate.

Figure 13:
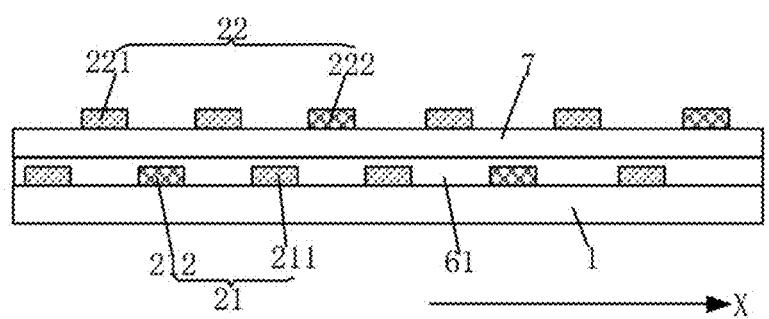
FIG. 13 is a cross-sectional view illustrating a part of a structure of an upper electrode and a lower electrode of a display substrate according to an embodiment of the present disclosure.

In some embodiments, referring to FIG. 13, which is a cross-sectional view illustrating a part of a structure of an upper electrode and a lower electrode of a display substrate according to an embodiment of the present disclosure, M>N; and M−N≤2. For example, M=2, and N=1; alternatively, N=2, and M=4. The display substrate with such an electrode structure can also improve, to a certain extent, the problem of asymmetric VT (i.e., voltage-transmittance) curve of the display panel in the prior art.

Figure 14:
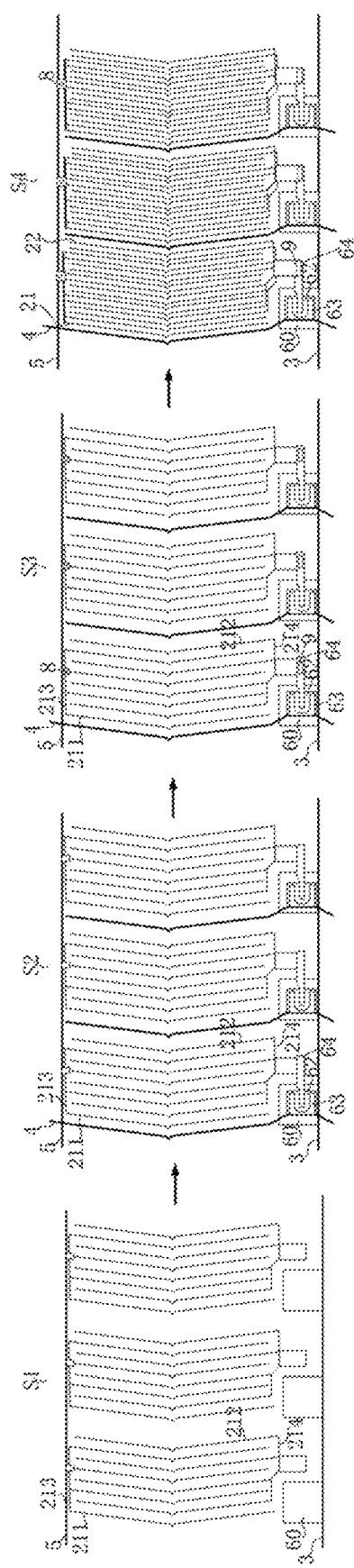
FIG. 14 is a schematic view illustrating a procedure of manufacturing the display substrate in FIG. 2A.

Based on the above-described structure of the display substrate, in a second aspect, an embodiment of the present disclosure further provides a method of manufacturing the display substrate. FIG. 14 is a schematic diagram illustrating a procedure of manufacturing the display substrate in FIG. 2A. Referring to FIG. 14, the manufacturing method includes: forming a plurality of sub-pixels on a base substrate. Forming the sub-pixels includes: sequentially forming a lower electrode 21 and an upper electrode 22 on a base substrate. Forming the lower electrode 21 includes: forming a plurality of first electrode strips 211 and a plurality of second electrode strips 212. Forming the upper electrode 22 includes: forming a plurality of third electrode strips 221 and a plurality of fourth electrode strips 222.

In some embodiments, the plurality of first electrode strips 211 and the plurality of second electrode strips 212 are formed through one patterning process. The plurality of third electrode strips 221 and the plurality of fourth electrode strips 222 are formed through one patterning process.

In some embodiments, the process of manufacturing the display substrate is as follows: in step S1, the gate line 3, the gate 60 of the switching transistor, the common electrode line 5 and the lower electrode 21 are formed on the base substrate.

The gate line 3, the gate 60 of the switching transistor, the common electrode line 5 and the lower electrode 21 are simultaneously formed through one patterning process. The first electrode strip 211 in the lower electrode 21 is connected to the common electrode line 5.

In step S2, a gate insulating layer, the first via 8 and the second via 9 in the gate insulating layer, the active layer 62, and the data line 4 and the source 63 and the drain 64, are sequentially formed on the base substrate after the step S1 is completed.

The data line 4, the source 63, and the drain 64 are simultaneously formed through one patterning process. The drain 64 is connected to the second electrode strip 212 in the lower electrode 21 through the second via 9 formed in the gate insulating layer.

In step S3, a passivation layer, and the first via 8 and the second via 9 in the passivation layer are sequentially formed on the base substrate after the step S2 is completed.

The first via 8 and the second via 9 are simultaneously formed in the passivation layer and the gate insulating layer through one patterning process.

In step S4, the upper electrode 22 is formed on the base substrate after the step S3 is completed.

The third electrode strip 221 in the upper electrode 22 is connected to the common electrode lines 5 through the first via 8. The fourth electrode strip 222 in the upper electrode 22 is connected to the drain 64 through the second via 9.

The process of manufacturing the display substrate according to the embodiment of the present disclosure is simple, and the manufacturing cost is low.

In a third aspect, an embodiment of the present disclosure further provides a display apparatus, which includes the display substrate in the foregoing embodiment.

In some embodiments, the display apparatus further includes an opposite substrate, which is aligned with the display substrate to form a cell gap. The cell gap is filled with liquid crystal.

In some embodiments, the opposite substrate includes a color filter layer, which includes red, green, and blue color filters and a black matrix. The red, green and blue color filters are arranged in a one-to-one correspondence with different sub-pixels, and the black matrix is correspondingly distributed in a region outside the sub-pixels. The color filter layer can enable the display apparatus to realize color display.

By adopting the display substrate in the embodiment described above, a uniform and symmetrical electric field may be formed in the display apparatus, so as to improve the problem of nonuniform distribution of the electric field in the display apparatus, thereby improving the problem of asymmetric VT (voltage-transmittance) curve existing in the display apparatus in the prior art, and improving the display transmittance and even the display effect of the display apparatus.

The display apparatus may be any product or component with a display function, such as an LCD panel, an LCD television, a mobile phone, a tablet computer, a notebook computer, a monitor, a digital photo frame, a navigator, or the like.

It will be understood that the above embodiments are merely exemplary embodiments adopted to illustrate the principles of the present disclosure, and the present disclosure is not limited thereto. It will be apparent to one of ordinary skill in the art that various changes and modifications can be made without departing from the spirit and scope of the present disclosure, and these changes and modifications also fall within the protection scope of the present disclosure.

What is claimed is:

1. A display substrate, comprising:
a base substrate; and
a plurality of sub-pixels on the base substrate and arranged in an array, wherein each of the plurality of sub-pixels comprises a lower electrode and an upper electrode, and the lower electrode and the upper electrode are sequentially stacked in a direction away from the base substrate;
the lower electrode comprises a plurality of first electrode strips and a plurality of second electrode strips; the upper electrode comprises a plurality of third electrode strips and a plurality of fourth electrode strips;
the plurality of first electrode strips are electrically connected to the plurality of third electrode strips;
the plurality of second electrode strips are electrically connected to the plurality of fourth electrode strips;
two adjacent electrode strips in the first electrode strips and/or the second electrode strips are spaced apart from each other; and
two adjacent electrode strips in the third electrode strips and/or the fourth electrode strips are spaced apart from each other;
M number of sequentially adjacent first electrode strips and N number of sequentially adjacent second electrode strips are alternately arranged;
M number of sequentially adjacent third electrode strips and N number of sequentially adjacent fourth electrode strips are alternately arranged; wherein M=N, M≤3 and N≤3; or M>N and M−N≤2, M=2 and N=1, or N=2 and M=4; and M and N are positive integers;
orthographic projections of the electrode strips of the upper electrode and the electrode strips of the lower electrode on the base substrate are alternately arranged; and
one of the first electrode strips and one of the fourth electrode strips are each arranged at a first place in a first direction, along which the first electrode strips and the second electrode strips are arranged and the third electrode strips and the fourth electrode strips are arranged.

2. The display substrate according to claim 1, wherein all the first electrode strips and the second electrode strips have a same width; and
a first spacing between any two adjacent electrode strips in the first electrode strips and/or the second electrode strips is equal.

3. The display substrate according to claim 2, wherein all the third electrode strips and the fourth electrode strips have a same width; and
a second spacing between any two adjacent electrode strips in the third electrode strips and/or the fourth electrode strips is equal.

4. The display substrate according to claim 3, wherein all the first electrode strips and the third electrode strips have a same width; and/or the first spacing and the second spacing are equal to each other.

5. The display substrate according to claim 3, wherein a ratio of the width of the first electrode strip to the first spacing is in a range from 1/3 to 3/4; and
a ratio of the width of the third electrode strip to the second spacing is in a range from 1/3 to 3/4.

6. The display substrate according to claim 3, further comprising a plurality of gate lines, a plurality of data lines, a plurality of common electrode lines, and a plurality of switching transistors;
each of the plurality of gate lines is between two adjacent rows of the sub-pixels;
each of the plurality of data lines is between two adjacent columns of the sub-pixels;
each of the plurality of common electrode lines is between two adjacent rows of the sub-pixels;
the gate line connected to the sub-pixels in a same row and the common electrode line connected to the sub-pixels in the same row are on two sides of the sub-pixels in this row along an extending direction of the data line;
the gate lines and the data lines are spatially crossed to form a plurality of pixel regions; and
lengths of the first electrode strip, the second electrode strip, the third electrode strip and the fourth electrode strip extend along the extending direction of the data line.

7. The display substrate according to claim 6, wherein the lower electrode further comprises a first connection part and a second connection part;
- the first connection part is at an end of the first electrode strip close to the common electrode line, and is connected to the first electrode strip and the common electrode line; and
- the second connection part is at an end of the second electrode strip close to the gate line, and is connected to the second electrode strip and a drain of the switching transistor.

8. The display substrate according to claim 7, wherein the upper electrode further comprises a third connection part and a fourth connection part;
- the third connection part is at an end of the third electrode strip close to the common electrode line, and is connected to the third electrode strip and the common electrode line; and
- the fourth connection part is at an end of the fourth electrode strip close to the gate line, and is connected to the fourth electrode strip and the drain of the switching transistor.

9. The display substrate according to claim 7, wherein a length of the first connection part extends along an extending direction of the common electrode line;
- the first connection part is connected to the plurality of first electrode strips to form a comb-shaped structure;
- a length of the second connection part extends along an extending direction of the gate line; and
- the second connection part is connected to the plurality of second electrode strips to form a comb-shaped structure.

10. The display substrate according to claim 8, wherein a length of the third connection part extends along the extending direction of the common electrode line;
- the third connection part is connected to the plurality of third electrode strips to form a comb-shaped structure;
- a length of the fourth connection part extends along the extending direction of the gate line; and
- the fourth connection part is connected to the plurality of fourth electrode strips to form a comb-shaped structure.

11. The display substrate according to claim 8, wherein a gate of the switching transistor, the gate line, the common electrode line, and the lower electrode are on the base substrate;
- an active layer of the switching transistor is on a side of the gate away from the base substrate, and a gate insulating layer is between the gate and the active layer;
- a source and the drain of the switching transistor are on a side of the active layer away from the base substrate, and are arranged at two opposite ends of the active layer, respectively;
- the upper electrode is on a side of the source and the drain away from the base substrate, and a passivation layer is between the upper electrode, and the source and the drain;
- the gate insulating layer and the passivation layer each further extend between the lower electrode and the upper electrode;
- the first connection part and the common electrode line are formed integrally into a one-piece structure;
- an orthographic projection of the third connection part on the base substrate at least partially overlaps an orthographic projection of the common electrode line on the base substrate;
- a first via is formed in the passivation layer and the gate insulating layer at a region where the orthographic projection of the third connection part on the base substrate overlaps the orthographic projection of the common electrode line on the base substrate, and the third connection part is connected to the common electrode line through the first via.

12. The display substrate according to claim 11, wherein a part of the second connection part extends such that an orthographic projection of the second connection part on the base substrate overlaps an orthographic projection of the drain on the base substrate;
- a part of the fourth connection part extends such that an orthographic projection of the fourth connection part on the base substrate overlaps the orthographic projection of the drain on the base substrate; and
- a second via is formed in the passivation layer and the gate insulating layer at a region where the orthographic projections of the second connection part, the fourth connection part and the drain on the base substrate overlap each other, and the fourth connection part is connected to the drain and the second connection part through the second via.

13. The display substrate according to claim 12, wherein one of the third electrode strips at an edge of the upper electrode extends toward the drain to form a first sub-portion;
- the drain extends toward the first sub-portion to form a second sub-portion; and
- orthographic projections of the first sub-portion and the second sub-portion on the base substrate overlap each other.

14. The display substrate according to claim 13, wherein one of the first electrode strips at the edge of the lower electrode extends toward the drain to form a third sub-portion; and
- an orthographic projection of the third sub-portion on the base substrate overlaps the orthographic projection of the second sub-portion on the base substrate.

15. The display substrate according to claim 14, wherein an orthographic projection of the third electrode strip at the edge of the upper electrode on the base substrate overlaps an orthographic projection of the data line on the base substrate; and
- a width of the third electrode strip at the edge of the upper electrode and having the orthographic projection on the base substrate overlapping the orthographic projection of the data line on the base substrate is greater than a width of the third electrode strip in the pixel region.

16. The display substrate according to claim 15, wherein an orthographic projection of the first electrode strip at an edge of the lower electrode on the base substrate overlaps the orthographic projection of the data line on the base substrate; and
- a width of the first electrode strip at the edge of the lower electrode and having the orthographic projection on the base substrate overlapping the orthographic projection of the data line on the base substrate is greater than a width of the first electrode strip in the pixel region.

17. The display substrate according to claim 6, wherein the sub-pixel is divided into two domains in the extending direction of the data line;
- a domain boundary between the two domains extends along an extending direction of the gate line;
- a part of the data line near the domain boundary is bent in a direction approaching the domain boundary; and
- parts of the first electrode strip, the second electrode strip, the third electrode strip and the fourth electrode strip near the domain boundary are each bent in the direction approaching the domain boundary, and bent shapes of the parts are each matched with a bent shape of the data line.

18. A method of manufacturing the display substrate according to claim 1, comprising: forming the plurality of sub-pixels on the base substrate;
 wherein the forming the plurality of sub-pixels comprises: sequentially forming the lower electrode and the upper electrode on the base substrate;
 the forming the lower electrode comprises: forming the plurality of first electrode strips and a the plurality of second electrode strips; and
 the forming the upper electrode comprises: forming the plurality of third electrode strips and the plurality of fourth electrode strips.

19. The method of manufacturing a display substrate according to claim 18, wherein the plurality of first electrode strips and the plurality of second electrode strips are formed through one patterning process; and
 the plurality of third electrode strips and the plurality of fourth electrode strips are formed through one patterning process.

20. A display apparatus, comprising the display substrate according to claim 1.

* * * * *